(12) United States Patent  (10) Patent No.: US 8,387,754 B2
Konig et al.  (45) Date of Patent: Mar. 5, 2013

(54) METHOD AND DEVICE FOR OILING THE AXIAL APPROACHES OF LOOSE WHEELS DISPOSED ON A SHAFT

(75) Inventors: Jan-Peter Konig, Gross Kreutz (Havel) (DE); Michael Drabek, Brandenburg (DE); Harald Klose, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 263 days.

(21) Appl. No.: 12/675,991

(22) PCT Filed: Sep. 16, 2008

(86) PCT No.: PCT/EP2008/062278

§ 371 (c)(1),
(2), (4) Date: Mar. 2, 2010

(87) PCT Pub. No.: WO2009/037241

PCT Pub. Date: Mar. 26, 2009

(65) Prior Publication Data

US 2010/0200335 A1    Aug. 12, 2010

(30) Foreign Application Priority Data

Sep. 22, 2007 (DE) .......................... 10 2007 045 368

(51) Int. Cl.
*F16H 57/04* (2010.01)
(52) U.S. Cl. ................................ 184/6.12
(58) Field of Classification Search ............... 184/6.12
See application file for complete search history.

(56) References Cited

U.S. PATENT DOCUMENTS

| 3,834,248 | A | * | 9/1974 | Caliri ............................... 74/443 |
| 4,360,094 | A | * | 11/1982 | Ikemoto et al. .......... 192/53.343 |
| 4,494,638 | A | * | 1/1985 | Zenker ........................ 192/48.91 |
| 6,474,444 | B1 | * | 11/2002 | Mochizuki .................... 184/6.12 |
| 7,022,039 | B2 | * | 4/2006 | Hasegawa et al. ............. 475/159 |
| 7,189,183 | B2 | * | 3/2007 | Fugel et al. .................... 475/331 |
| 7,384,360 | B2 | * | 6/2008 | Ploetz et al. ................... 475/159 |
| 2005/0059523 | A1 | | 3/2005 | Hasegawa et al. |
| 2005/0143215 | A1 | | 6/2005 | Fugel |
| 2008/0011263 | A1 | * | 1/2008 | Klose ........................ 123/196 R |

FOREIGN PATENT DOCUMENTS

| DE | 198 22 904 A1 | 12/1999 |
| DE | 199 54 636 A1 | 5/2001 |
| DE | 101 64 203 C1 | 4/2003 |
| DE | 102 03 265 A1 | 7/2003 |
| DE | 102 16 137 A1 | 10/2003 |
| DE | 103 17 421 A1 | 11/2004 |
| DE | 103 34 880 A1 | 3/2005 |
| EP | 0 476 395 A2 | 3/1992 |
| JP | 2 176 247 A | 7/1990 |
| JP | 2004 076810 A | 3/2004 |
| JP | 2005 249052 A | 9/2005 |

* cited by examiner

*Primary Examiner* — William E Dondero
*Assistant Examiner* — Michael Riegelman
(74) *Attorney, Agent, or Firm* — Davis & Bujold, PLLC

(57) ABSTRACT

A method for oiling the axial stops (10) on components (6, 17, 18) fixed on a shaft (1), provided for loose wheels (2, 3) arranged on the shaft. According to the method, oiling of the axial stops (10) occurs by supplying oil through an axially extending bore or oil duct (5) of the shaft (1) and through grooves (11, 12) formed on the axial stop (10) with the grooves being in fluid flow connection with the oil duct (5).

18 Claims, 3 Drawing Sheets

METHOD AND DEVICE FOR OILING THE AXIAL APPROACHES OF LOOSE WHEELS DISPOSED ON A SHAFT

This application is a National Stage completion of PCT/EP2008/062278 filed Sep. 16, 2008, which claims priority from German patent application serial no. 10 2007 045 368.1 filed Sep. 22, 2007.

FIELD OF THE INVENTION

The present invention relates to a method for oiling the axial stops on components fixed on a shaft, provided for loose wheels arranged on the shaft. In addition, the invention relates to the design of the axial stops on components fixed on a shaft, provided for loose wheels arranged on the shaft.

BACKGROUND OF THE INVENTION

According to the prior art, in manual shift transmissions of passenger cars the oiling of axial stops on components fixed on a shaft, provided for loose wheels arranged on the shaft, for example synchronizing elements of synchronizers, takes place by oil being splashed up from the immersion sump, and for this purpose oil collection pockets are formed in one of the partners (i.e. in the loose wheel or in the component fixed on the shaft) so that oil is transported inward to the site of the bearing.

When a gear is engaged, by virtue of the system the axial stops of the loose wheel associated with the gear are damaged by fretting corrosion caused by microscopic movements of the partners involved. In this context it has been found that an adequate oil supply minimizes the fretting corrosion and therefore improves the wear behavior.

DE 198 22 904 C2 describes a method for applying a lubricant layer on a tribologically stressed surface of a stop disk, and a corresponding stop disk, such that at least under load conditions the lubricant layer contains boric acid. To produce it, the stop disk to be coated is placed in a reactor, the reactor is evacuated and a process gas is then introduced which contains boron, nitrogen and/or carbon at least in compound form, or which releases the corresponding element under process conditions and which penetrates into the area of the object's surface, in particular by diffusion.

To produce an intermediate layer containing boron and oxygen, a second pre-material containing boron at least in compound form, which releases the boron under process conditions, and a first pre-material containing oxygen at least in compound form, which releases the oxygen under process conditions, are introduced in the gas phase to be precipitated. According to DE 198 22 904 C2, at the latest during use the boron and oxygen of the intermediate layer are at least partially transformed, in the area of freely accessible surfaces and with the help of hydrogen, into boric acid which acts as a dry lubricant.

From EP 0476395 B1 a stop disk arrangement for planetary gearwheels on a planetary gear carrier is known, with stop disks having recesses arranged in pairs next to one another, of which at least the inner stop disks are formed as perforated steel disks held without being rotationally fixed and the outer stop disks are formed as bronze-clad disks provided with recesses at their openings for the planetary gear bolts, which overlap the ramps and recesses in the planetary gear carrier directed toward the sun gear opening of the planetary gear carrier and form lubricant collection pockets. In this known stop disk arrangement, the outer stop disks are held in a rotationally fixed manner on the planetary carrier and have a circular curve shaped lateral edge which approximately follows the sun gear opening.

SUMMARY OF THE INVENTION

The purpose of the present invention is to indicate a method for oiling the axial stops on components fixed on a shaft, provided for loose wheels arranged on the shaft. In addition, a design is indicated for the axial stops on components fixed on a shaft, provided for loose wheels, which enables the oiling thereof to be optimized and the method according to the invention to be implemented.

For a method for oiling the axial stops on components fixed on a shaft provided for loose wheels arranged on the shaft, this objective is achieved by the characteristics specified in the claims. An advantageous design of the axial stops on components fixed on a shaft, provided for loose wheels arranged on the shaft, is the object of the claims. Other design features and advantages emerge from the corresponding subordinate claims.

According to these it is proposed that the oiling of the axial stops on components fixed on a shaft, provided for loose wheels, takes place by supplying the oil through a bore or oil duct that extends axially through the shaft and through grooves formed in the axial stop which are in fluid flow connection with the oil duct.

This procedure is particularly advantageous when the shaft on which the loose wheels and the fixed component are arranged is in any case hollow-bored or has a bore or oil duct extending axially for the forced lubrication of rotating components from the inside. In such a case too, sufficient oil is available for oiling the axial stops on a component fixed on the shaft provided for loose wheels arranged on the shaft.

According to the invention, instead of the oil pockets known from the prior art for supplying oil to the loose bearing and axial stops using splashed oil from outside, the component fixed on the shaft has a plurality of preferably radially directed, through-going grooves distributed on the side of the axial stop of the component facing toward the loose wheel, around the periphery of the axial stop, which are in fluid flow connection with the axial bore or oil duct of the shaft; these grooves prevent oil stagnation and enable lubrication of the axial stops on components fixed on the shaft provided for loose wheels, as the oil flows through.

In an advantageous further development of the invention, in addition or alternatively to the through-going grooves, shorter, non through-going grooves are also provided, which are distributed on the side of the axial stop of the component facing toward the loose wheel, around the periphery of the axial stop, which are in fluid flow connection with the axial bore or oil duct of the shaft and are shorter than the outer diameter of the axial stop on the component fixed on the shaft.

This ensures that by virtue of the rotational speed of the shaft and hence of the component fixed thereto, and the resulting centrifugal force, a large enough oil pressure is produced between the axial stop and the loose wheel for a quantity of oil sufficient for lubrication always to be squeezed in between the axial stop and the loose wheel.

According to the invention, the grooves can be needle-shaped and extend radially, although they may also have other shapes; for example the grooves may be curved.

If both through-going and non through-going grooves are provided, these are preferably arranged in alternation around the periphery of the axial stop on the component fixed to the shaft.

By virtue of the concept according to the invention, sufficient oiling of the axial stop can be achieved both if there is a speed difference between the loose wheel and the component fixed on the shaft (for example when a gear involving the loose wheel is not engaged) and also when there is no speed difference between the loose wheel and the component fixed to the shaft (for example when the gear is engaged). The larger the number of grooves, the more effective is the oiling when there is no speed difference, since a larger area of the axial stop can then be lubricated.

The component fixed on the shaft can be, for example, the synchronizing element of a synchronizer, or part of a claw-type shift element without a synchronizing device, or a stop disk.

When the component fixed on the shaft is the synchronizing element of a synchronizer, it can be provided that, as viewed radially, a through-going groove is formed under each of the pressure element positions, whereby the pressure elements can be supplied with oil.

According to the invention, the proposed design of the axial stop can be produced in an at least partially cost-neutral manner by sintering, so that manufacturing costs are kept low.

Compared with the designs known from the prior art, distributing the oiling around the periphery of the axial stop minimizes fretting corrosion more effectively, and this results in a considerable improvement of the wear behavior.

A further advantage of the invention is that owing to the distribution of the oiling around the periphery of the axial stop, the area of the load-bearing axial stop can be increased so that the contact pressure is lower. This further reduces wear. Furthermore, by virtue of the number, geometry, dimensions and/or distribution of the grooves, the supply of lubricating oil to the axial stop can be influenced selectively.

BRIEF DESCRIPTION OF THE DRAWINGS

Below, an example of the invention is explained in greater detail with reference to the attached figures, which show.

DETAILED DESCRIPTION OF THE PREFERRED EMBODIMENTS

Figure 1:
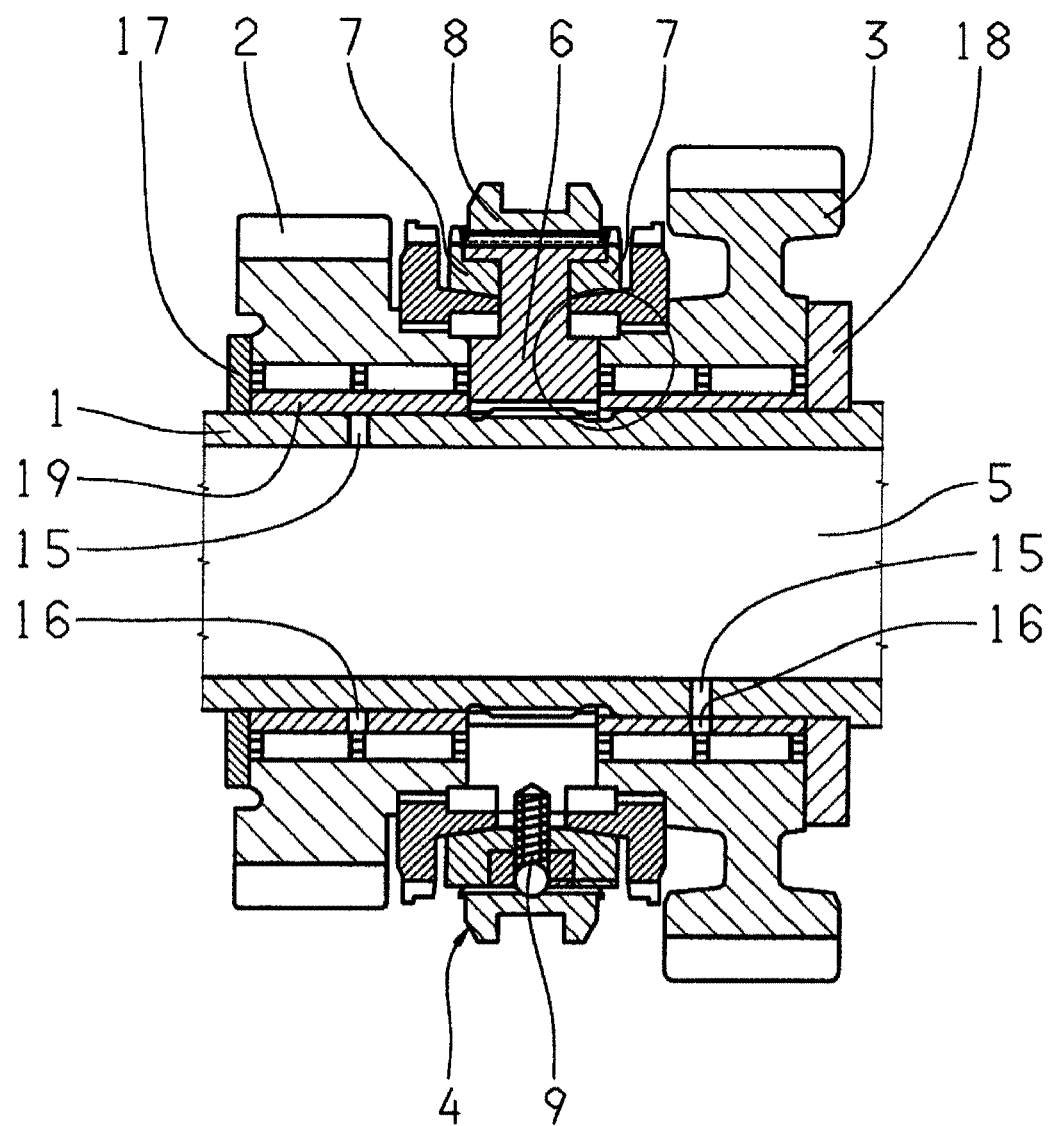
FIG. 1: Schematic sectional view of a first and a second loose wheel arranged on a hollow-bored shaft, with a synchronizer arranged between the loose wheels, and such that the oiling of the axial stops on the synchronizer takes place in accordance with the invention

FIG. 1 shows two loose wheels 2, 3 arranged on a shaft 1 which is hollow-bored for oil supply purposes, whose axially extending bore or oil duct is indexed 5, each of the loose wheels having claw teeth and being able to be selectively connected in a rotationally fixed manner to the shaft 1 by a synchronizer 4. As known from the prior art, the synchronizer comprises a synchronizing element 6 connected in a rotationally fixed manner to the shaft 1, as well as synchronizing rings 7 and a shifting sleeve 8. In addition, in conventional fashion the synchronizer comprises preferably three pressure elements 9.

According to the invention, the oiling of the axial stops on the synchronizing element 6 of the synchronizer 4 provided for the loose wheels 2, 3 takes place by delivering oil through the axial bore or oil duct 5 of the shaft 1. For this purpose the shaft 1 has radial bores 15 leading from the surface of the shaft 1 through to the axial oil duct 5, which co-operate with radial bores 16 of the bearing bushes 19 to let through the oil.

Figures 2, 2A:
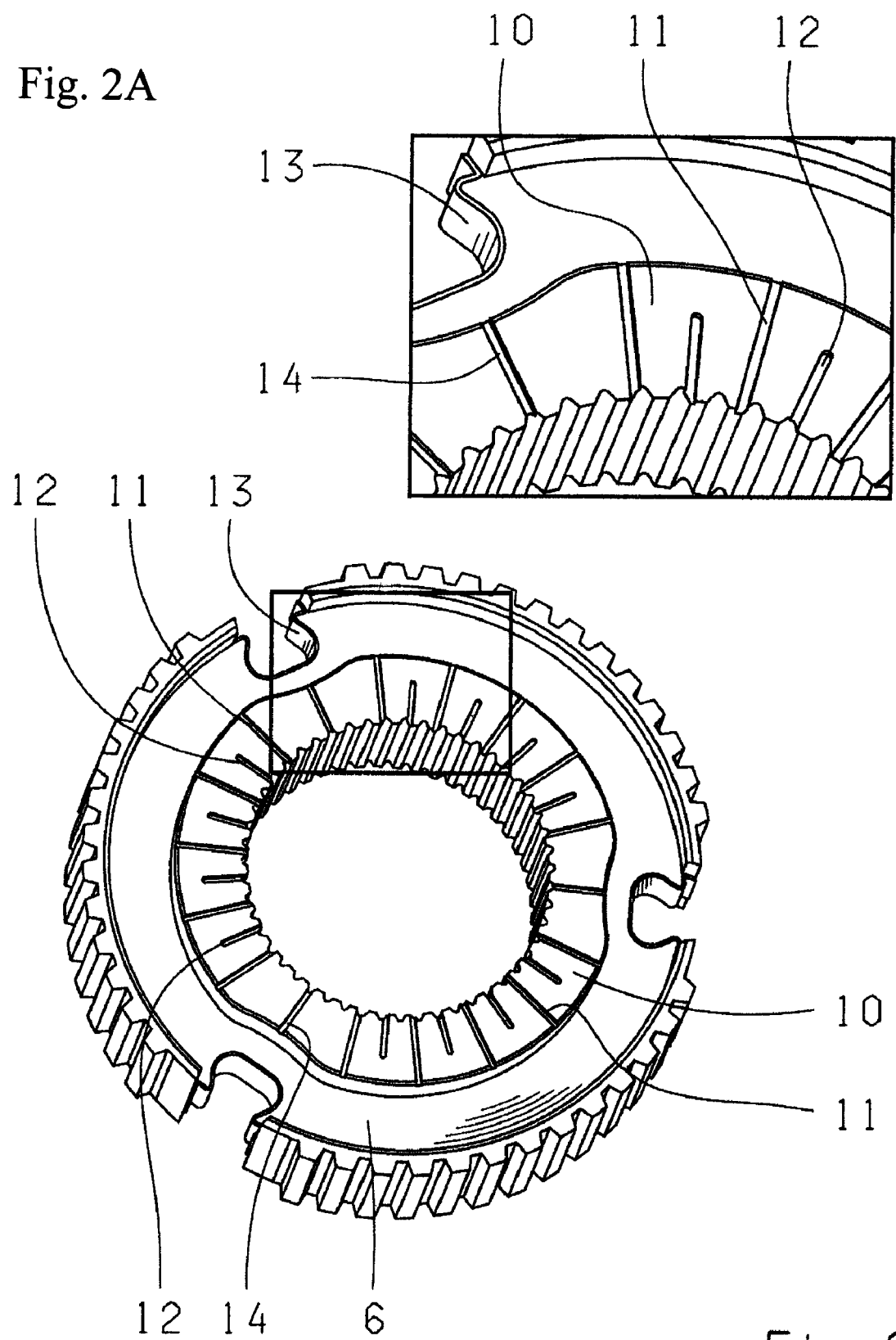
FIGS. 2 and 2A: Perspective overhead view of an axial stop on the synchronizing element of a synchronizer formed according to a preferred embodiment of the invention, with a detailed view of part of it.

FIGS. 2 and 2A show a particularly advantageous embodiment of an axial stop 10 according to the invention on the synchronizing element 6 of the synchronizer 4. The axial stop 10 has a plurality of radially extending, through-going, needle-like grooves 11 distributed around the periphery of the axial stop on the side thereof facing toward the respective loose wheel, the grooves being in fluid flow connection with the axial bore or oil duct 5 of the shaft 1.

Furthermore, in the example embodiment shown, in addition to the through-going grooves 11 shorter, non through-going grooves 12 are also provided, which are also distributed around the periphery of the axial stop on the side thereof facing toward the respective loose wheel, and which are in fluid flow connection with the axial bore or oil duct 5 of the shaft 1; the grooves 12 are shorter than the outer diameter of the axial stop 10 on the synchronizing element 6 of the synchronizer 4.

In FIG. 2 the pressure element positions or pressure element holders provided on the synchronizing element 6 of the synchronizer 4 are indexed 13; as can be seen from the figure, under each of these pressure element holders 13 as viewed radially is provided a through-going groove 14, which serves to supply oil to the pressure element 9. In the example shown, the length of the groove 14 is the same as the length of the non through-going grooves 12.

Figure 3A:
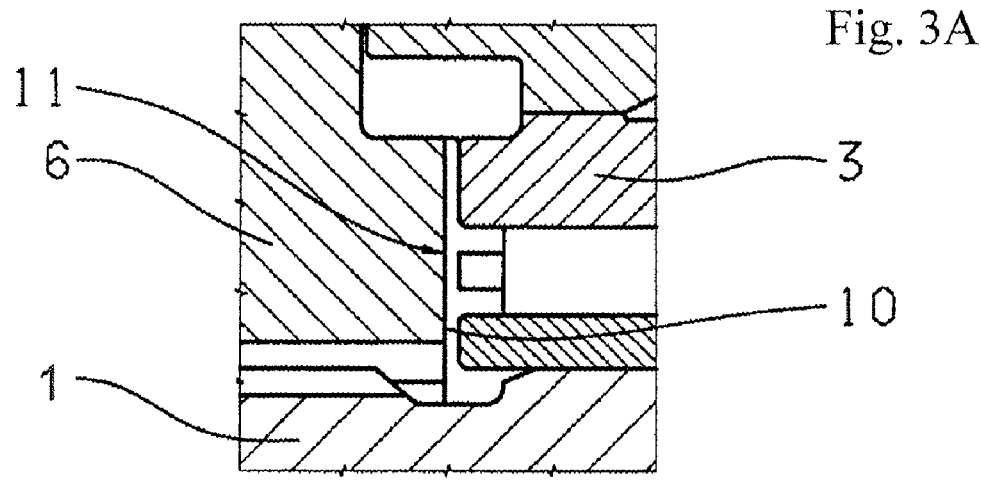
FIGS. 3 and 3A: Two schematic detail views of the area in FIG. 1 enclosed by a circle, to illustrate a design feature of the axial stop according to the invention
Figure 3:
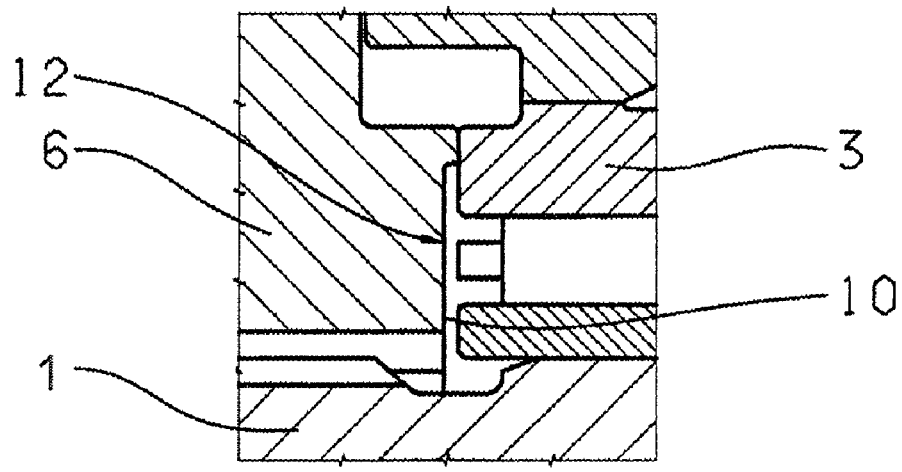

The object of FIGS. 3 and 3A are two schematic detailed views of the area enclosed by a circle in FIG. 1, to illustrate the design of the axial stop 10. In this case, in the sectioned view shown in FIG. 3, a non through-going groove 12 can be seen, whereas in the sectioned view shown in FIG. 3A, a through-going groove 11 is represented.

FIG. 1 also shows the stop disks 17, 18 arranged on the side of the loose wheels 2, 3 facing away from the synchronizer 4. According to the invention, the axial stop of the stop disks 17, 18, like the axial stop 10 for the loose wheels, can be formed on the synchronizing element in order to achieve effective oiling and thereby improve the wear behavior.

Of course, any design forms and in particular any spatial arrangements of the components of the device according to the invention for oiling the axial stops on components fixed on a shaft, provided for loose wheels arranged on the shaft, in themselves and relative to one another and provided they are technically appropriate, fall under the protective scope of the present claims without affecting the function of the device as indicated in the claims, even if such forms are not represented explicitly in the figures or in the description.

INDEXES

1 Shaft
2 Loose wheel
3 Loose wheel
4 Synchronizer
5 Oil duct
6 Synchronizer element
7 Synchronizing ring
8 Shifting sleeve
9 Pressure element
10 Axial stop
11 Through-going groove
12 Non through-going groove
13 Pressure element holder
14 Through-going groove
15 Radial bore 16 Radial bore
17 Stop disk
18 Stop disk
19 Bearing bush

The invention claimed is:

1. A method of oiling axial stops (10) on components (6, 17, 18) fixed on a shaft (1), provided for loose wheels (2, 3) which are arranged on the shaft (1), the method comprising the steps of:
    forming an axially extending oil duct (5) within the shaft (1) and providing at least one radial bore (15);
    providing a plurality of grooves (11, 12) comprising both a set of radially extending through-going grooves (11), which each extend from a radially inner edge of a radially extending surface of the axial stop (10) to a radially outer edge of the radially extending surface, and a set of radially extending non-through going grooves (12), which each extend from the radially inner edge of the radially extending surface of the axial stop (10) toward, but terminate prior to reaching, the radially outer edge of the radially extending surface;
    supplying oil to each axial stop (10) through the oil duct (5) within the shaft (1) and into both the through-going grooves (11) and the non-through going grooves (12) so that the grooves on each axial stop (10) are in fluid flow connection with the oil duct (5).

2. The method of oiling the axial stops (10) on components (6, 17, 18) fixed on the shaft (1) according to claim 1, further comprising the step of influencing the application of oil to the axial stop (10) by at least one of a quantity, a geometry, dimensions and a distribution of the through-going grooves (11) and the non-through going grooves (12) grooves (11, 12).

3. The method of oiling the axial stops (10) on components (6, 17, 18) fixed on the shaft (1) according to claim 1, further comprising the step of arranging the through-going grooves (11) and the non-through going grooves (12) grooves (11, 12) around a circumference of the axial stop (10) facing toward the respective loose wheel (2, 3).

4. The method of oiling the axial stops (10) on components (6, 17, 18) fixed on the shaft (1) according to claim 1, further comprising the step of alternately arranging both the through-going and the non through-going grooves (11, 12) around a circumference of the axial stop (10) on the component (6, 17, 18) fixed on the shaft (1).

5. The method of oiling the axial stops (10) on components (6, 17, 18) fixed on the shaft (1) according to claim 1, further comprising the step of utilizing one of a synchronizing element (6) of a synchronizer (4), a part of a claw-type shift element without a synchronizing device, and a stop disk (17, 18) as the component fixed on the shaft.

6. The method of oiling the axial stops (10) on components (6, 17, 18) fixed on the shaft (1) according claim 5, wherein the component fixed on the shaft is the synchronizing element (6) of the synchronizer (4), and the method further comprising the step of oiling pressure elements through at least one through-going groove (14) formed, when viewed radially, under each one of pressure element position or pressure element holder (13).

7. An axial stop (10) on a component (6, 17, 18) fixed on a shaft (1), the shaft having an axial oil duct (5), provided for a loose wheel arranged on the shaft,
    wherein the axial stop (10) comprising a plurality of both through-going and a plurality of non through-going grooves (11, 12) which are formed on a side of the axial stop (10) facing toward the loose wheel (2, 3), and being in fluid flow connection with the axial oil duct (5) which extends axially within the shaft (1) for oiling the axial stop (10);
    the through-going grooves (11) each extend from a radially inner edge of a radially extending surface of the axial stop (10) to a radially outer edge of the radially extending surface, and the non-through going grooves (12) each extend from the radially inner edge of the radially extending surface of the axial stop (10) toward, but terminate prior to reaching, the radially outer edge of the radially extending surface.

8. The axial stop (10) on the component (6, 17, 18) fixed on the shaft (1) according to claim 7, wherein the plurality of through-going and the non through-going grooves (11, 12) are distributed around a circumference of the axial stop (10).

9. The axial stop (10) on the component (6, 17, 18) fixed on the shaft (1) according to claim 7, wherein the plurality of through-going and the plurality of the non through-going grooves (11, 12) are alternately arranged around a circumference of the axial stop (10) on the component (6, 17, 18) fixed on the shaft.

10. The axial stop (10) on the component (6, 17, 18) fixed on the shaft (1) according to claim 7, wherein the plurality of through-going and the plurality of non through-going grooves (11, 12) are formed in the radially extending surface of the axial stop (10) which abuts the loose wheel (2, 3).

11. The axial stop (10) on the component (6, 17, 18) fixed on the shaft (1) according to claim 7, wherein the plurality of through-going and the plurality of non through-going grooves (11, 12) each extend radially.

12. The axial stop (10) on the component (6, 17, 18) fixed on the shaft (1) according to claim 7, wherein when the component fixed on the shaft is the synchronizing element (6) of the synchronizer (4), and at least one through-going groove (14) which, when viewed radially under each pressure element holder (13), lubricates the pressure element (9).

13. An axial stop of a component that is fixed on a shaft so as to rotate with the shaft, the shaft having an oil duct located therein which extends axially within the shaft (1), the axial stop comprises at least one radially extending surface that axially abuts a loose wheel (2, 3), the at least one radially extending surface having a plurality of radially extending through-grooves (11) and radially extending non through-grooves (12), the through-grooves (11) extend radially completely through the axial stop from a radially inner edge of the radially extending surface of the axial stop (10) to a radially outer edge of the radially extending surface and the non through-grooves (12) extend only partially radially through the axial stop from the radially inner edge of the radially extending surface of the axial stop (10) toward, but terminate prior to reaching, the radially outer edge of the radially extending surface;
    an axially extending oil duct (5) being formed within the shaft (1) and having at least one radial bore (15), and
    the plurality of the through-grooves (11) and the non through-grooves (12) being in fluid communication with the at least one radial bore (15) of the oil duct to direct oil from the oil duct to along the surface abutting the loose wheel.

14. The axial stop according to claim 13, wherein each of the plurality of the non through-grooves (12) extends radially between two adjacent through-grooves (11).

15. The axial stop according to claim 13, wherein each of the plurality of the non through-grooves (12) is radially aligned with another of the plurality of the non through-grooves (12).

16. The axial stop according to claim 15, wherein each of the plurality of through-grooves (11) is radially aligned with another of the plurality of through-grooves (11).

17. The axial stop according to claim 13, wherein only one of the non through-grooves (12) extends radially between two adjacent through-grooves (11).

18. The axial stop according to claim 13, wherein a width of the through-grooves (11) is substantially the same as a width of the non through-grooves (12).

* * * * *